United States Patent
Serot et al.

(10) Patent No.: US 11,868,316 B2
(45) Date of Patent: Jan. 9, 2024

(54) EVENT MANAGEMENT DEVICE AND METHOD

(71) Applicant: AMADEUS S.A.S., Biot (FR)

(72) Inventors: Thibault Serot, Waverton (AU); Maxime Godeau, Bourg des comptes (FR); Jeremy Teyssedre, Vallauris (FR); Mathieu Philippe Alexis Beynel, Pegomas (FR); Amar Muharemovic, Antibes (FR)

(73) Assignee: AMADEUS S.A.S., Biot (FR)

( * ) Notice: Subject to any disclaimer, the term of this patent is extended or adjusted under 35 U.S.C. 154(b) by 238 days.

(21) Appl. No.: 16/837,473

(22) Filed: Apr. 1, 2020

(65) Prior Publication Data

US 2020/0320038 A1    Oct. 8, 2020

(30) Foreign Application Priority Data

Apr. 2, 2019    (FR) ...................................... 1903521

(51) Int. Cl.
 *G06F 16/17*    (2019.01)
 *G06F 16/182*    (2019.01)
 *G06N 20/00*    (2019.01)

(52) U.S. Cl.
 CPC ........ *G06F 16/1734* (2019.01); *G06F 16/182* (2019.01); *G06N 20/00* (2019.01)

(58) Field of Classification Search
 None
 See application file for complete search history.

(56) References Cited

U.S. PATENT DOCUMENTS

| | | | | |
|---|---|---|---|---|
| 9,013,294 B1 * | 4/2015 | Trundle | ................. | G08B 29/02 |
| | | | | 340/522 |
| 2016/0350306 A1 * | 12/2016 | Hurley | .................... | H04W 4/02 |
| 2018/0357556 A1 * | 12/2018 | Rai | ........................ | G06N 20/00 |
| 2020/0005243 A1 * | 1/2020 | Pong | ................. | G06Q 10/1053 |

FOREIGN PATENT DOCUMENTS

| | | |
|---|---|---|
| FR | 3021788 A1 | 12/2015 |
| FR | 3062228 A1 | 7/2018 |

OTHER PUBLICATIONS

Alok Sinha: "Client-server computing", Communications of the ACM, Association for Computing Machinery, Inc, United States, vol. 35, No. 7,Jul. 1, 1992, pp. 77-98.

* cited by examiner

*Primary Examiner* — Scott A. Waldron
(74) *Attorney, Agent, or Firm* — Perry + Currier (57) ABSTRACT

Embodiments of the invention provide an event management device for managing events comprising an event detector configured to detect the occurrence of an event related to data delivered by a data delivery system and to extract user data related to the detected event from a user data storage, the extracted user data comprising user data stored in at least one entry of the user data storage. The event management device further comprising a rule manager configured to determine one or more actions to be executed by applying one or more rules using the extracted user data, the event management device being configured to trigger execution of at least one determined action. The system may further dynamically update the rules using feedback data received for the executed actions.

11 Claims, 7 Drawing Sheets

EVENT MANAGEMENT DEVICE AND METHOD

CROSS-REFERENCE TO RELATED APPLICATION

This application claims priority to French patent application no. 1903521, filed Apr. 2, 2019, the contents of which are incorporated herein by reference.

TECHNICAL FIELD

The present invention generally relates to information management and more specifically to an event management device, method and computer program.

BACKGROUND

Modern computing systems, such as data delivery systems, collect a huge volume of data from various data sources, including user data needed by the applications executing in the systems.

A data delivery system generally comprises one or more data structures in which user data received from such data sources are aggregated. A data delivery system generally inputs such user data statically to applications executing in the system.

However, modern data delivery systems are subject to strong time response constraints. This involves processing an important volume of data with high computational performances to be able to deliver a response to the client devices with a very low latency.

The data delivered by a data delivery system are generally delivered for a given set of users, in response to a client request received from a client device. The delivered data may represent for example products that will be used by the set of users, such as travel tickets, entertainment tickets, electronic books, musical or video items, etc. In the process of delivering data to a client device for a given set of users, the users are generally identified in the data delivery system using user information. The data delivery system generally maintains such user data in one or more storage data structure. The data delivery system may also retrieve additional data related to the user from various heterogeneous data sources (internal or external to the system).

Such user data represent a huge volume of heterogeneous data maintained by the data delivery system which form key resources. Existing data delivery systems use a number of applications that require access to such user data. The execution of such applications generally requires important computational resources due to the heterogeneity of the user data, the variety of sources from which they are received, and the huge number of users associated with such data, which can increase the overall latency of the data delivery system.

Further, a data delivery system also executes a number of applications or is connected to external applications which may be impacted by real-time events related to user data maintained by the data delivery system.

SUMMARY

Existing data delivery systems are not capable of dynamically detecting in real-time such events, while maintaining an optimal response time and high availability to the user data. There is accordingly a need for an improved data delivery system that is capable of dynamically detecting real-time events related to user data.

To overcome these problems, there is provided an event management device for managing events. The device comprises an event detector configured to detect the occurrence of an event related to data delivered by a data delivery system and to extract user data related to the detected event from a user data storage, the extracted user data comprising user data stored in at least one entry of the user data storage. The event management device further comprises a rule manager configured to determine one or more actions to be executed by applying one or more rules using the extracted user data, the event management device being configured to trigger execution of the at least one determined action.

In one embodiment, the rule manager may comprise a rule memory for storing rules and a rule engine for managing the rules stored in the rule memory Each rule may comprise a condition part comprising a logical combination of at least one condition and an action part comprising a logical combination of at least one action, the rule engine being configured to determine the at least one action to be executed from the action part of each applied rule depending on the verification of the logical combination of condition of the applied rule.

In some embodiments, the rules may be stored in the rule memory in the form of one or more tree data structure associated with the rules, the rule engine being configured to apply a rule to the extracted data by parsing at least one tree data structure.

Each tree data structure may be associated with a given rule of the rule memory and represents the condition part of the rule.

In some embodiments, the device may further comprise a data extraction unit configured to extract the user data from the user data storage in response to the detected event, the data extraction unit being further configured to extract event-related data from the detected event.

The data extraction unit may be configured to generate a description file integrating the extracted user data and/or the extracted event related data, the description file being used by the rule manager to determine the at least one action to be executed.

In some embodiments, the rule manager may be configured to select the one or more rules to be applied using extracted user data, and/or extracted event related data from the detected event and/or data from external data sources.

The user data storage may comprise one or more entries, the user data stored in each entry of the user data storage comprising user information related to a set of users and/or data information related to the data delivered by the data delivery system to the set of users.

In some embodiments, the device may comprise a machine learning engine configured to determine an action relevance score for each executed action, using feedback values received for the executed action during a period of time.

The device may be configured to dynamically update the rules in the rule memory based on the action relevance scores determined for the executed actions associated with the rules.

In some embodiments, the device may further comprise an action relevance database configured to store, for each executed action, the action relevance score determined for the action by the machine learning engine. The rule manager may be then configured to determine an action to be executed in the form of a logical combination of actions using at least one Boolean operator, the system being configured to trigger execution of at least one of the actions of the logical combination determined by the rule manager, based on the action relevance score associated with the actions of the logical combination in the action relevance database.

There is further provided a method for managing events in a data delivery system. The method comprises:
- detecting the occurrence of an event related to the data delivered by the data delivery system,
- extracting user data related to the event from a user data storage, the extracted user data comprising user data stored in at least one entry of the user data storage,
- determining one or more actions to be executed by applying one or more rules using the extracted user data comprised in each of the entries of the user data storage,
- triggering execution of the at least one determined action.

There is also provided a computer program comprising program code instructions for executing the method according to preceding embodiment, when the program is executed on a computer.

The embodiments of the invention enable dynamically detecting in real-time events related to user data and triggering actions in response to the detected events. They further enable updating the rules used to trigger actions using meta-learning data.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
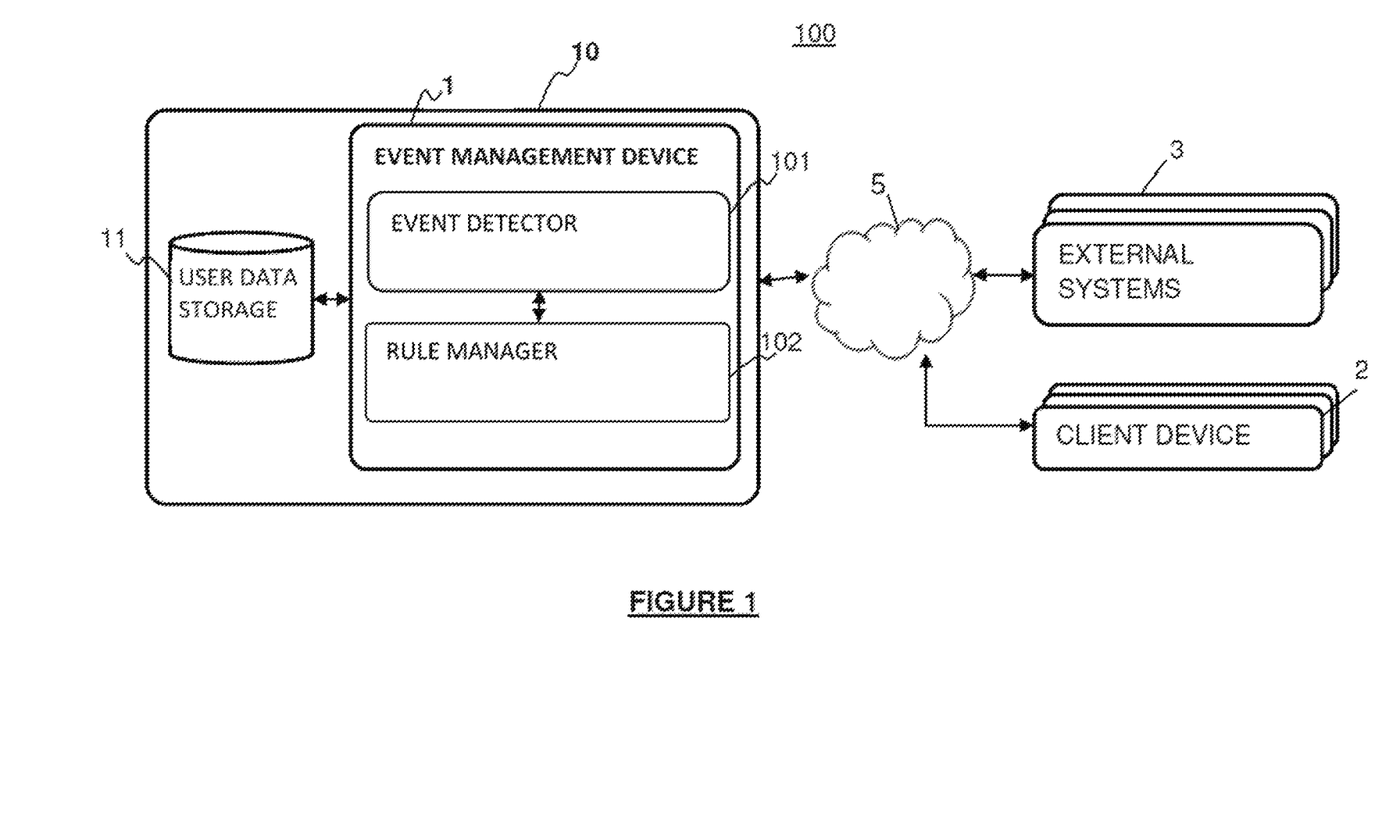
FIG. 1 is a block diagram of an environment of a data delivery system implementing an event management device, according to some embodiments.

FIG. 1 shows an exemplary environment 100 of a data delivery system 10 configured to deliver data to one or more users through client devices 2. The data delivery system 10 may use one or more data structure 11 (also referred to hereinafter as "user data storage") configured to store user data related to the users, such user data being collected from one or more data sources. The user data storage 11 may be included in the data delivery system 10 or stored in an external system connected to the data delivery system.

According to some embodiments, the data delivery system 10 may comprise an event management device 1 configured to detect events related to the data delivered by a data delivery system (10), such as events having an impact on the data delivered by the data delivery system to users, and trigger actions in response to the detected events using rules. The event management device 1 may comprise an event detector 101 configured to detect the occurrence of an event and select user data related to the event from the user data storage 11, the selected user data comprising user data related to at least one entry of the user data storage 11. The event management device 1 may further comprise a rule manager 102 configured to determine one or more actions to be trigger by applying one or more event-based rules (generally referred to as 'rules' hereinafter) using the selected user data, related to each entry of the user data storage. The event management device 1 may then trigger execution of at least some of the determined actions.

As used herein, an 'event' refers to any event related to data delivered by the data delivery system 10. A 'rule' may depend on data related to a detected event and/or to user data extracted from user data storage and/or data from external data sources such as weather conditions.

In some embodiments, the event management device 1 may be further configured to dynamically update the rules based on an action relevance score determined for each executed action, using feedback values received for an executed action during a period of time, according to a rule-oriented machine learning process.

The event detector 101 thus monitors occurrence of events that can have an impact on the data previously delivered to users or being delivered to users to dynamically trigger actions depending on the detected events.

The data delivery system 10 may be connected to the one or more client devices 2 through one or more communication networks 5.

Each client device 2 may be a personal computing device, a tablet computer, a thin client terminal, a smartphone, and/or other such computing device. Each client device 2 may host web browsers and/or custom applications software (e.g., a client system) and may include a client user interface.

Each client device 2 may further include a web-browser application that communicates with a web-server application hosted by the data delivery system 10.

The communication network 5 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. Each communication network 5 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over each network 5 according to different data exchange technologies and/or formats such as the hypertext markup language (HTML) and the extensible markup language (XML).

The user data storage 11 may store various user data related to the users of the data delivery system 10.

As used herein a 'user' of the data delivery system 10 refers to a user associated with the data delivered by the data delivery system 10 to a client device 2, the user being identified during the process of delivering the data to the user to indicate that this user will be the consumer of the data. A user may be identified by submitting a set of information related to the user to the data delivery system 10, in response to the selection of data by the user himself or another user different from the user and acting on behalf the user of the data through a client device 2.

As used herein, the 'data' delivered by the data delivery system refer to any content that may be provided to a user device 2 through a user interface in the form of products, each product being possibly associated with one or more complementary products related to the product (representing complementary services). The term "product" will be also used hereinafter to refer to the data delivered by the data delivery system. Each product may be represented by a set of parameters. In some embodiments, a product may be associated with a product value (also called 'product price'). Each product may be subdivided into elementary parts (also called hereinafter 'segment'). A segment of a product refers to the smallest portion of a product that can be delivered by the data delivery system 10.

A representation of the products delivered by the data delivery system 10 may be generated on a Graphical User Interface of a client device 2 using various representation elements such as electronic text, images, pictures, audio recordings, and other data forms which can be processed, stored, and returned.

In some embodiments, a product may be delivered to a group of users comprising two or more users, in a same product delivery session, in response to a unique client request, for example for delivery of an entertainment, hotel or travel product to a group of users who desire to attend together to an entertainment activity (museum, theatre, show, etc.), book a room in the same hotel the same day, travel together.

In response to a client request comprising a set of request parameters, the data delivery system 10 may perform a search in a product database using a search algorithm implemented by a search engine to determine a set of candidate products that match the client request. The set of candidate products may be filtered using various filtering criteria. In one embodiment, the set of candidate products may be filtered using availability data representing the real-time or quasi real-time availability of the candidate products and/or product value information such as the prices of the candidate products. The filtered products may be ordered depending on a set of ordering criteria, such as the product values. A rendering of the filtered product may be generated on the user interface of the client device 2 from which the request was emitted. The display may take into account the ordering of the filtered products.

The user who emitted the request from the client device 2 may select one of the displayed candidate products and initiate a booking session to book the selected product for one or more users. The booking session may be completed subject to a successful booking transaction or a payment transaction consisting in receiving a payment corresponding to a value (price) determined from the product value (product price) associated with the product.

The booking session may further include prompting and receiving information related to the set of users to which the product will be delivered.

An entry may be created in the user data storage 11 in response to the booking of the product for the identified set of users. An entry identifier may be assigned to each entry created in the user data storage. The entry associated with the identified set of users for the selected product may include User Information related to the set of users and comprising i) user information received from the emitting client device 2 during the booking session and ii) additional user information retrieved from other user databases connected to the data delivery system using user identifiers corresponding to each user of the set of users;

Product Information related to the product booked for the set of users during the booking session.

Data Delivery System Information comprising information related to the data delivery system.

In an exemplary application of the invention to a travel product delivery system 10, the user data stored in the data storage 11 may be data related to the traveler(s) and the information related to the data delivered by said data delivery system may be travel product information such as flight products (flight tickets).

The User Information may include:

Personal information associated with each user of the set of users such as the user name, user gender, nationality, date and place of birth, address, identifier, phone number, passport details, etc.;

user profile information comprising information related to the client profile of each user (frequent user, previous bookings, user preferences, etc).

In an exemplary application of the invention to a travel product delivery system 10 delivering travel products to a user in response to a travel request comprising request parameters, the user data storage 11 may be a file referred to as the "passenger name record (PNR)", stored in a database of a Computer Reservation System (CRS). In such exemplary application, the user data storage 11 (PNR) may comprise for each user (referred to as a "passenger") various data collected from one or more data sources:

Personal information associated with the passenger, such as the name of the passenger and/or passenger contact information and/or identification information related to the user who requested the product and performed the transaction;

Product information (e.g. itinerary information) corresponding to the product purchased by the passenger or by a group of passengers travelling together, and/or product identification details (product reference or number, product time limit).

In an exemplary application of the invention where the data delivery system 10 may be configured to deliver heterogeneous travel products, PNRs can be used for any type of product delivered by the data delivery system (flight or train ticket, hotel room booking, car, etc.).

The PNR may also store addition user information such as frequent flyer data, user preference (e.g. seat type request), special user Requests (SSR) (e.g. meal requirements, wheelchair assistance, unaccompanied children), and/or additional product information such as tax amounts paid to other entities for the product, the payment type, etc.

A PNR file may be created in the user database 11, in response to the selection of a product by a user for the passenger(s) and the completion of a purchase transaction by the user for the product. The CRS may be part of a centralized data distribution system, such as a Global Distribution System GDS, shared by several data delivery systems or an independent CRS. Each created PNR file may be identified in the user database 11 using the entry identifier (also called 'Record Locator' in an application of the invention to a PNR). The record locator associated with the user entry in the user data storage 11 may be an alpha or alpha-numeric identifier, which will be associated with the user entry in the user data storage 11 even if subsequent changes are made to the entry. The record locator may also be referred to as a confirmation number, reservation number, confirmation code, booking reference, a PNR number, and the like.

Copies of the PNR information may be sent to the CRSs of the other connected data delivery systems which deliver similar products. The CRSs receiving the copies of the created PNR may create in turn copies of the created PNR in their own user data storage 11 to be able to deliver other portions of the requested user itinerary. Alternatively, several data delivery systems delivering similar products may host their CRS in a GDS and share their PNR through the GDS. The record locators of the copied PNRs are communicated back to the CRS that holds the created PNR. Updates of the PNR can thus be exchanged when the status of the trip changes in any of the CRSs.

Each component/field (user name, product information, product time limit, etc.) of a PNR may be identified by a code.

A PNR thus serves as a unique identifier from a specific data delivery system that is used to record a specific product.

Embodiments of the invention may be implemented by a computing system comprising one or more networked computers or servers. The computing system may provide processing and database functions for content provider.

Figure 2:
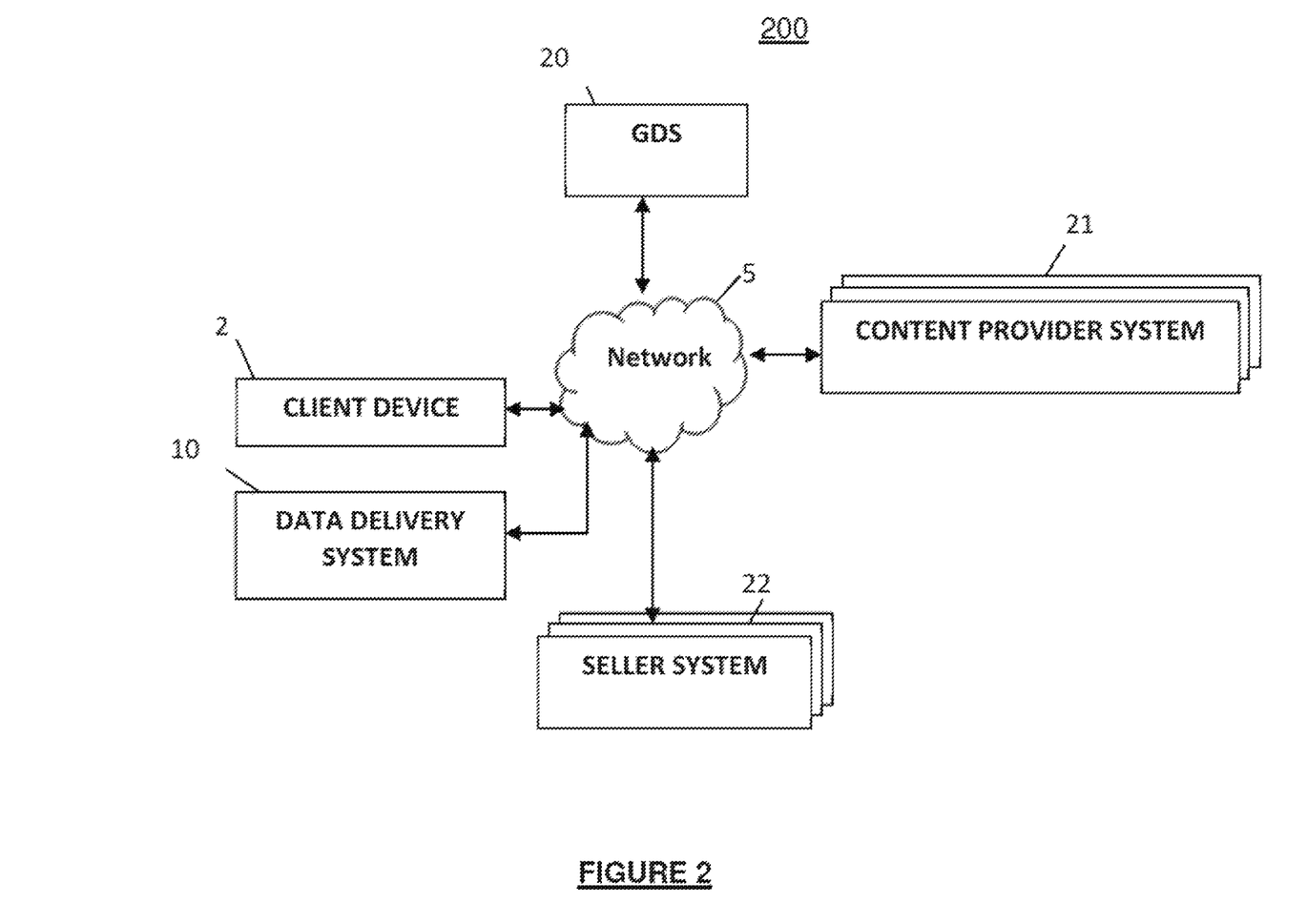
FIG. 2 is a block diagram of an example operating environment that is suitable for implementing aspects of the present invention.

Referring now to FIG. 2, an exemplary operating environment 200 is shown in accordance with an embodiment of the invention in which the data delivery system 10 is a travel booking system. The environment 200 may include a centralized data distribution system 20 such as a GDS (Global Distribution System), one or more indirect content provider systems 21 such as carrier systems, and indirect seller systems such as a travel agency system 22, and one or more client devices 2. Each of the centralized data distribution system 20, the indirect content provider systems 21, the indirect seller system 22, and the user devices 2 may communicate through a network 5. The indirect content provider systems 21 may each include a Computer Reservation System (CRS) and/or billing system for the respective airline that enables the centralized data distribution system 20 and/or indirect seller system 22 to reserve and pay for airline tickets. The indirect content provider systems 21 may also interact with each other, either directly or through the centralized data distribution system 20, to enable a validating carrier to sell tickets for seats provided by an operating carrier, The operating carrier may then bill the validating carrier for the services provided.

The centralized data distribution system 20 may be configured to facilitate communication between the indirect content provider systems 21 and indirect seller systems 22 by enabling travel agents, validating carriers, or other indirect sellers to search for available segments and book reservations on one or more indirect content provider systems 21 via the centralized data distribution system 20. The centralized data distribution system 20 may maintain links to each of the carrier systems 21 via the network 5. These links may allow the centralized data distribution system 20 to obtain scheduling and availability data for segments from the indirect content provider systems 21, and travel proposal reservation requests to the content provider systems 21. The content provider systems 21 and indirect seller systems 22 may thereby book flights, trains, or other types of segments on multiple carriers via a single connection to the centralized data distribution system 20. The centralized data distribution system 20 may store and/or maintain a Passenger Name Record (PNR) that includes a complete set of data for an itinerary of a trip, including segments from multiple carriers and/or other travel services comprising the trip such as hotel and rental car reservations.

An indirect seller system 22, such as a travel agency system, may include a web server that provides a publicly accessible website. This website may be configured to provide access to travel products, by performing a search for travel products in response to a travel request. To this end, the seller system 22 may provide users with access to data using one or more databases hosted by the centralized data distribution system 20, the provider systems 21, and/or the seller systems 22. Alternatively, the seller system 22 may be a proprietary system (e.g. travel agency system) that provides access to a limited set of users (e.g. travel service providers or travel agents), in which case access may be provided through a private website or other application.

The data delivery system 10 may be in communication with the seller system 22 via the network 5 or some other suitable connection. In alternative embodiments of the invention, all or a portion of the data delivery system 10 may be integrated into one or more of the other systems 20, 21, 22, 23. Users or travel agents may use the seller system 22 to generate and/or search for travel products that satisfy a travel request received from the user using the data delivery system 10.

The centralized data distribution system 20, the carrier systems 21, the travel agency system 22, the travel provider system 2, and the client devices 2 of the operating environment may be implemented on one or more computing devices or systems, referred to collectively as a computer, such as computer.

Figure 3:
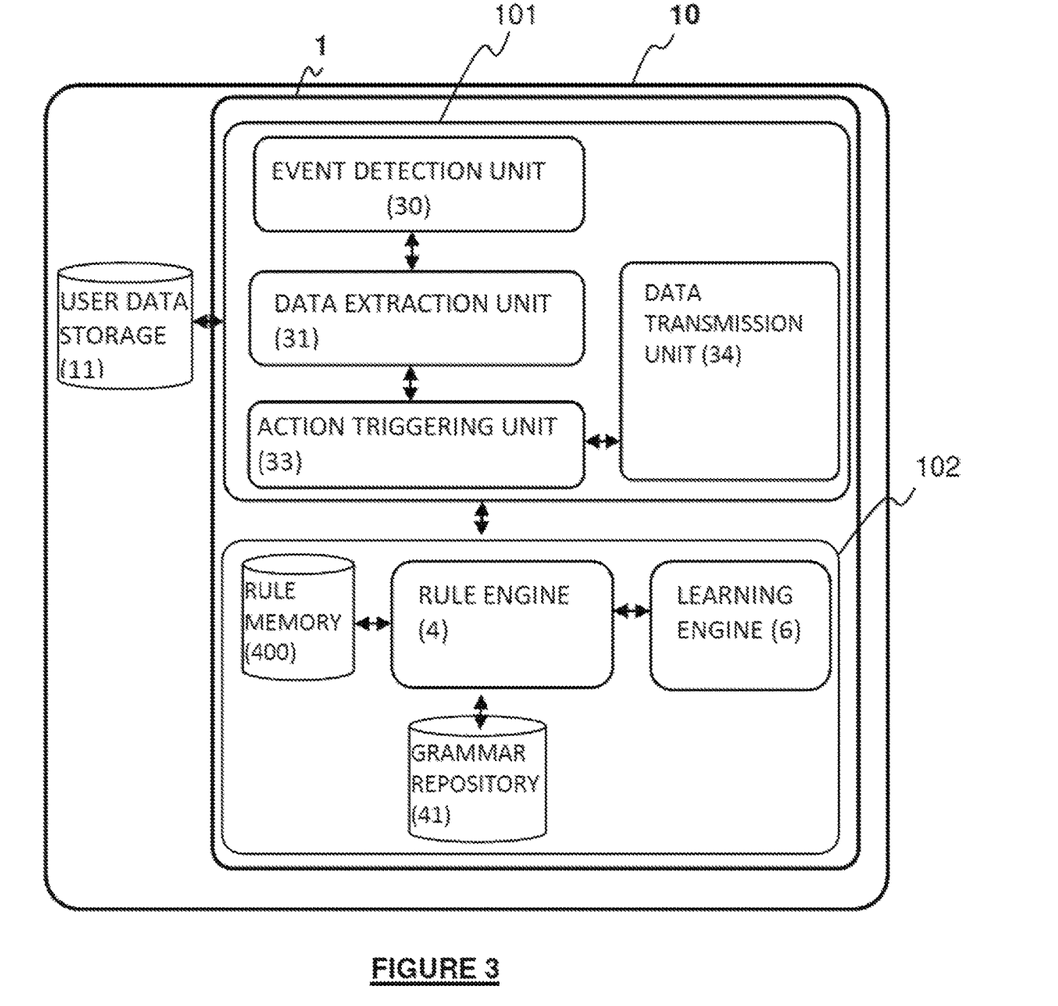
FIG. 3 is a block diagram of an event detection device, according to some embodiments.

FIG. 3 is a block diagram of the event management device 1, according to some embodiments of the invention.

Embodiments of the invention enable detection of events related to the user data stored in the data storage unit 11 and triggering of actions to one or more internal or external applications using self-adaptive rules, As shown in FIG. 3, the event management device 1 may comprise an event detection unit 30 configured to detect occurrence of an event related to at least one user identified in an entry of the user database storage 11. The events may be event internal to the system (internal events) or event external to the system (external events). The events may be detected by various means using information received by internal applications or external devices or systems connected to the data delivery system 10.

In an exemplary application of the invention to a data delivery system 10 delivering travel products such as airline tickets, an event may be for example:
    a disruption in a user itinerary identified in an entry of the user database storage 11 in association with a user;
    issuance of a ticket (corresponding to a travel product) identified in an entry of the user database storage 11 in association with a user;
    delay of a flight (travel product) identified in an entry of the user database storage 11 in association with a user.

More generally, the type of events detected by the event detection unit 30 may comprise:
    User independent external events non specific to a set of users such as for example a soccer event in Russia at a given date; the data extraction unit 31 will then extract from the user data storage 11 entries corresponding to users identified as soccer fans, retrieve additional user data correlated to these identified users from the user data storage 11, transform them into a description file and transmit the description file to the rule engine 4 for action mapping using rules corresponding to the extracted data, User dependent events which are specific to one or more user such as an event related to a booking for a given flight product to Russia; the data extraction unit 31 will then extract from the user data storage 11 entries corresponding to users for which a booking for the given flight product to Russia exist, retrieve additional user data correlated to these identified users from the user data storage 11, transform them into a description file and transmit the description file to the rule engine 4 for action mapping using rules corresponding to the extracted data.

The event management device 1 may further comprise a data extraction unit 31 configured to extract user data related to the detected event from the user data storage 11. The data extraction unit 31 may comprise a data analyser 311 for determining the user data that are to be extracted from the user data storage based on the detected event. The data extraction unit 31 may comprise a parser to parse the event information received, a division unit to separate the parsed event information into a set of portions, and a selection unit to select data from at least some of the portions, the selected data representing the data extracted from the data extraction unit 31.

The data extraction unit 31 may be adapted to extract data of various formats from the user data storage 11. The data extraction unit 31 may be configured to transform the format of the extracted data into a unified format. In one embodiment, the data extraction unit 31 may extract the user data into a description file having a unified format such as an XSLT (eXtensible Stylesheet Language Transformations) file. The data extraction unit 31 may further extract event related data from the detected event and integrate such event-related data in the description file.

The rule manager 102 may use the user data and the event-related data extracted by the data extraction unit 31 to determine the rules that are to be applied to the extracted user data.

The event management device 1 may further comprise an action triggering unit 32 configured to triggered an action in the data delivery system 10 based on the data extracted from the user data storage 11, in response to the detected event. The action may be executed by one or more applications or functions implemented in the data delivery system 10 and/or by one or more external applications. In embodiments, where the triggered action is executed at least partially by one or more external applications, the data extraction unit 31 may be configured to send at least a part of the data extracted from the user data to the application(s) external to the data delivery system 10, such as for example an application running in an external system or device 3.

In one embodiment, the event detection unit 30 may comprise a data interpreter 300 capable of interpreting the events notified to the data delivery system 10. The event detection unit 30 may further comprise a correlation module 302 configured to calculate a correlation between an interpreted event and predefined event data stored in the data delivery system 10. The data interpreter 300 of the event detection unit may use at least one processor to interpret data corresponding to an incoming event in real time.

The action triggering unit 33 may be configured to apply a set of rules 400 managed by a rule engine 4 of the rule manager 102.

For example, in an application of the invention to a travel product delivery system 10, the event detection unit 30 may detect an event corresponding to the "detection of a disruption in the itinerary of a user". The data extraction unit 31 may then extract the profile of the corresponding user in the user data storage 11 (such as information related to his fidelity card, etc), transmit the extracted data to the action triggering unit 33, which in turn may trigger an action corresponding to emission of a file to an external notification system 3 comprising a proposal for an indemnification to the user, for example in the form of a voucher, the file being generated using rules 400 provided by the rule engine, depending on the extracted user data. The external notification system 3 may for example generate an electronic message to be sent to the email address of the user comprising an indemnification offer.

The rule engine 4 may comprise a rule memory 40 for storing the rules applied to the data received from the data extraction unit 31.

As used herein, a "rule" handled by the rule engine 4 refers to one or more logical conditions related to a set of parameters which, depending on their assessment with respect to received parameter values, define one or more actions to be performed by the data delivery system. A rule is thus a conditional instruction. A RULE can be expressed for example in the form:

"IF {(condition $C_1$) $OP_1$ (condition $C_2$) $OP_2$ (condition $C_3$) ... (condition $C_i$ (condition $C_{i+1}$) ... (condition $C_{N-1}$) $OP_{N-1}$ (condition $C_N$)}, THEN {(Action $A_1$) $OP'_1$ (Action $A_2$) $OP'_2$ (Action $A_3$) ... (Action $A_j$) $OP'_j$ (Action $C_{j+1}$) ... (Action $A_{M-1}$) $OP'_{M-1}$ (Action $A_M$)}, In the above RULE expression:

N and M refers to integer number at least equal to 1;

C designates the i-th condition of the RULE;

designates the j-th action associated with the RULE;

$OP_i$ refers to a boolean operator, such as the operator AND.

$OP'_j$ refers to a boolean operator, such as the operator AND; in one embodiment, the operator $OP_i$ and $OP_j$ may be all AND operators.

The 'CONDITION PART' of the RULE comprises a combination of condition $C_i$ and refers to: {(condition $C_1$) $OP_1$ (condition $C_2$) $OP_2$ (condition $C_3$) ... (condition $C_i$) $OP_i$ (condition $C_{i+1}$) ... (condition $C_{N-1}$) $OP_{N-1}$ (condition $C_N$)};

The 'ACTION PART' of the RULE comprises a combination of actions A refers to {(Action $A_1$) $OP'_1$ (Action $A_2$) $OP'_2$ (Action $A_3$) ... (Action $A_j$) $OP'_j$ (Action $C_{j+1}$) ... (Action $A_{M-1}$) $OP'_{M-1}$ (Action $A_M$)}.

A rule thus comprises a condition part which is assessed based on the extracted user data and an action part representing actions that are to be triggered if the assessment of the conditions expressed in the condition part is successful. In the following description of some embodiments of the invention, the expression 'a rule associated with an action' will be used to refer to a rule which returns the action as a consequence of an assessment of the rule conditions.

As used herein an "action" defines a function or an operation or an application that is to be triggered by the action triggering unit 33 using one or more resources of the data delivery system 10. The 'triggering of an action' refers to the 'execution of the action'.

The conditions related to a given rule may be defined using terms stored in a grammar repository 41, such terms being mapped to one or more components of the data delivery system 10.

A rule thus binds the parameters of the logical conditions with data provided from/to components of the data delivery system. In particular, a condition for a given rule is assed using parameter values corresponding to the data extracted by the data extraction unit 31 and determines actions that are mapped to internal and/or external applications and are to be triggered by the action triggering unit 33 depending on such assessment.

For example, assuming that the event detection unit 30 detects an internal event related to a user profile or a user information change, the rule engine 4 may apply a rule R: IF {C1 AND C2 AND C3 AND C4} THEN A1, with:

C1={For a given booking B in user profile associated with a given user U},
C2={Off point=BLR} (Bengaluru),
C3={Booking cabin=J},
C4={Day Until Departure metric=5}.

The application of the rule R by the rule engine 4 will return action A1 IF the condition combination ={C1 AND C2 AND C3 AND C4} is verified, with:

A1=Booking taxi at destination for user U

To trigger the action A1, the action triggering unit 32 may retrieve the arrival time of the corresponding itinerary from the user data storage 11.

In another example, it is assumed that the event detection unit 30 detects an external event, the rule engine 4 may apply a rule R': IF {C1 AND C2 } THEN A1, with:
C'1=There is match in Nice Arena;
C'2=User U' has flight departing around same time from NCE (Nice).

The application of the rule R' by the rule engine 4 will return action A'1 IF the condition combination ={C'1 AND C'2} is verified, with:

A'1=Sending a Short Message using a Short Messaging System application to the User U' including a recommendation to leave home 4*h* in advance.

The execution of a rule thus produces an output that identifies one or more actions to be triggered by the action triggering unit 33.

The event detector 101 may further comprise a publishing unit 34 configured to publish data to one or more external applications of an external system or device 3 in response to the triggering of an action by the action triggering unit 33. In one embodiment, the publishing unit 34 may publish data to the external system or device 3 in the form of an aggregated list of one or more user profile data corresponding to user data filtered depending on the external system or device 3, The external application of the external system or device 3 to which the user data are published may be an application using user data to be executed, such as an electronic messaging application, an application Programming Interface, etc.

Embodiments of the invention thus enables transforming user data aggregated in the user data storage 11 into actions in response to detected events using rules provided by the rule engine 4.

The user data can be accordingly extracted dynamically in response to a detected event (internal and/or external) and actions may be also dynamically triggered by applying rules provided by the rule engine 4 to the extracted user data.

The rule engine 4 may be configured to match one or more rules with data received from the data extraction unit 31 using a tree data structure. The data extraction unit 31 may provide extracted user data to the rule engine 4 in the form of a description file such as an XSLT file. The data extraction unit 31 may further include event data related to the detected event in the description file.

The use of a tree data structure by the rule engine 4 enable determining correlations between extracted user data and actions.

Figure 6:
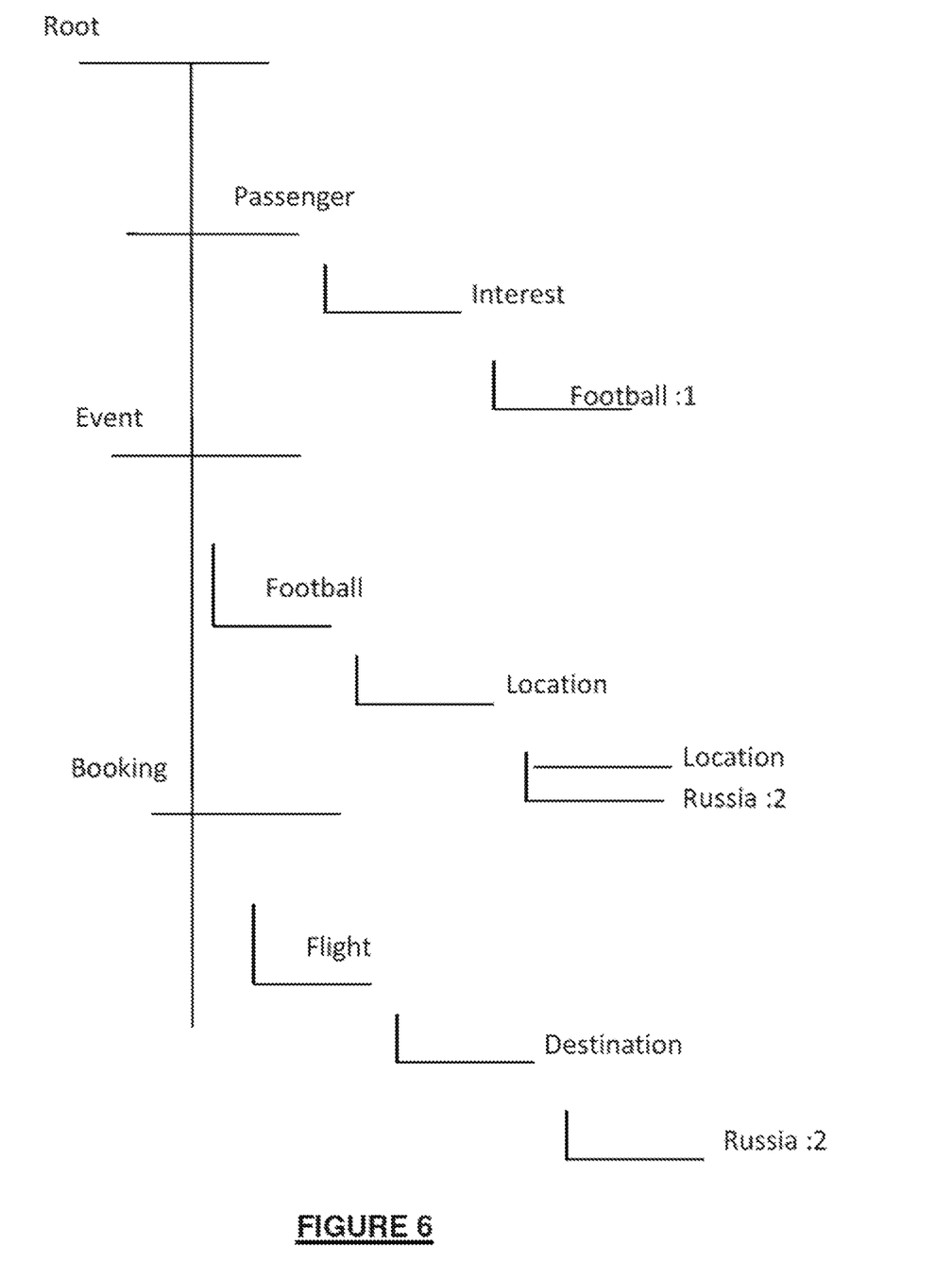
FIG. 6 shows a tree data structure used to represent an exemplary rule managed by the rule manager, according to one embodiment.

The tree data structure may comprise a set of nodes starting from a root node. Each node represents a rule related to a set of parameters, and the child nodes represent possible values for the parameter of the rule. An exemplary condition part of a rule comprising two conditions may be for example IF "a soccer event in Russia at a given date" (C1) and IF "the passenger has a booking for Russia at he given date" (C2), The tree data structure thus represents the condition part of the rule, An exemplary tree data structure 60 is depicted in FIG. 6.

The rule memory 401 may comprise one or more databases for storing the tree data structures.

In one embodiment, the rule manager 102 may further comprise a rule-oriented machine learning engine 6 connected to the rule engine 4. The learning engine 6 may be configured to receive feedback data related to the executed action from a set of users during a predefined learning period, and determine an action relevance score for the executed action based on the feedback data received from a set of at least one users.

The event management device 1 may for example submit a feedback request related to an action to a set of users for which the action has been executed for prompting the users of the set of users to provide a feedback value for the executed action in the form of an action relevance score assigned to the executed action. In some embodiments, the user may be prompted to select a score value among a number of predefined score values on the user device 2. The predefined score values may for example comprise a reward value, a penalty value and a neutral value (if the user does not provide a feedback), The data delivery system 10 may receive back a score value for the executed action from at least some of the users from their user devices 2. The learning engine 6 may then compute a relevance score for the executed action based on the received score values (user feedbacks). Alternatively, the user feedback for an executed action may be determined dynamically for each user for which an action has been triggered based on data collected for the user in connection with the triggered action (for example, a user feedback may be set to a reward score if a user did use an offered indemnification corresponding to a triggered action).

The learning engine 6 may thus compute a relevance score for each executed action and transmit the relevance score to the rule engine 4 in association with the corresponding action. The learning engine may use additional user information from the user data storage 11 to apply a weight to the elementary action scores received by the users before computing the overall action relevance score.

In one embodiment, the rule engine 4 may update the rules 400 which are applied to determine an action that is to be triggered based on the relevance score received from the learning engine 6 for the action, during runtime. The rule update may include deletion, addition, and/or modification of the rules associated with an action.

As the condition part of the rules are implemented in the form of tree data structures, the rule engine 4 may be configured to update a rule by updating the corresponding tree data structure depending on the overall relevance score computed for an executed action related to the rule.

In one embodiment, the rule engine 4 may be used in a testing mode to test one or more rules with a selected set of testing users and select the rules to be implemented in operation mode based on the feedback received by the testing users.

The rule engine 4 thus implements Rule Oriented-Machine learning enabling to adaptively update a rule 400 based on the user feedback values received for the action executed as a result of the application of the rule).

Alternatively, the action relevance scoring and/or the elementary action scorings received back from users for the executed actions may be used by the event detector 101 to determine the actions that are to be triggered in response to an event. In such embodiments, the action part of a rule may be defined with a boolean operator, denoted OF, which may be for example a OR or a AND Boolean operator. The action part of the rule may be then in the form {Action $A_1$ OP Action $A_2$ OP $A_3$ . . . OP ACTION $A_j$ . . . OP Action $_M$}. In some embodiments, the list of actions {$A_1$, $A_j$, . . . $A_M$} associated with the action part of a rule may change over the time, as a result of the rule updates.

In one embodiment, the event management device 1 may be configured to correlate each executed action with the action relevance score determined by the learning engine 6. The rule engine 4 may then select at least one of the action Ai of the action part of a rule depending on the relevance score associated with the action Ai. In one embodiment, the event management device 1 may use an action relevance memory (not shown) such as a database to correlating each executed action with the action relevance score determined by the learning engine 6.

In another embodiment, the event management device 1 may be configured to correlate each executed action with a given user and with the elementary action score (feedback value) received from the given user by the learning engine 6. The rule engine 4 may determine at least one of the action Ai of the rule action part to be triggered for the user(s) identified by the extracted user data using the elementary action score associated with the action Ai and the user(s). In such embodiment, the event management device 1 may use an action relevance memory (not shown) such as a database to correlating each executed action with a given user and with the elementary action score (feedback value) received from the given user by the learning engine 6.

Advantageously, according to the embodiments of the invention, the rules can be updated (created, deleted or modified) dynamically during the operation of the data delivery system 10 without a need to interrupt the system to update the rule, which ensures service continuity and relevance of the triggered actions. Each of the triggered action can thus be fed back to the data delivery system for dynamic adaptation of the rules managed by the rule engine.

The rule engine 4 may be initialized at boot time with a predefined set of rules in the rule memory 401, forming a starting set of rules. The set of rules can be then dynamically refined during runtime using feedback data received by the learning engine 6.

As a result, the operation of the rule engine 4 can be accelerated, while obviating the need for a rule validation process to load new rules in memory, delete rules from memory or update the rules. This also avoids maintaining inconsistent rules. As a result, the fill rate of the rule memory 401 maintained by the rule engine 4 and therefore the latency of the rule engine 4 can be optimized.

The embodiments of the invention thus provide a high availability event management system 1 capable of maintaining self-adaptive rules. The event management system 1 further enables the data delivery system to generate actions depending on detected event and the rules maintained by the rule engine using applications of the data delivery system 10 in real or quasi real time (meaning that between a detected event and the triggering of an action, the response time is less that few seconds).

It should be further noted that the operation of the event management system 1 enables instantaneous detection of events while not limiting access by other applications to the user data maintained in the user data storage 11.

Figure 4:
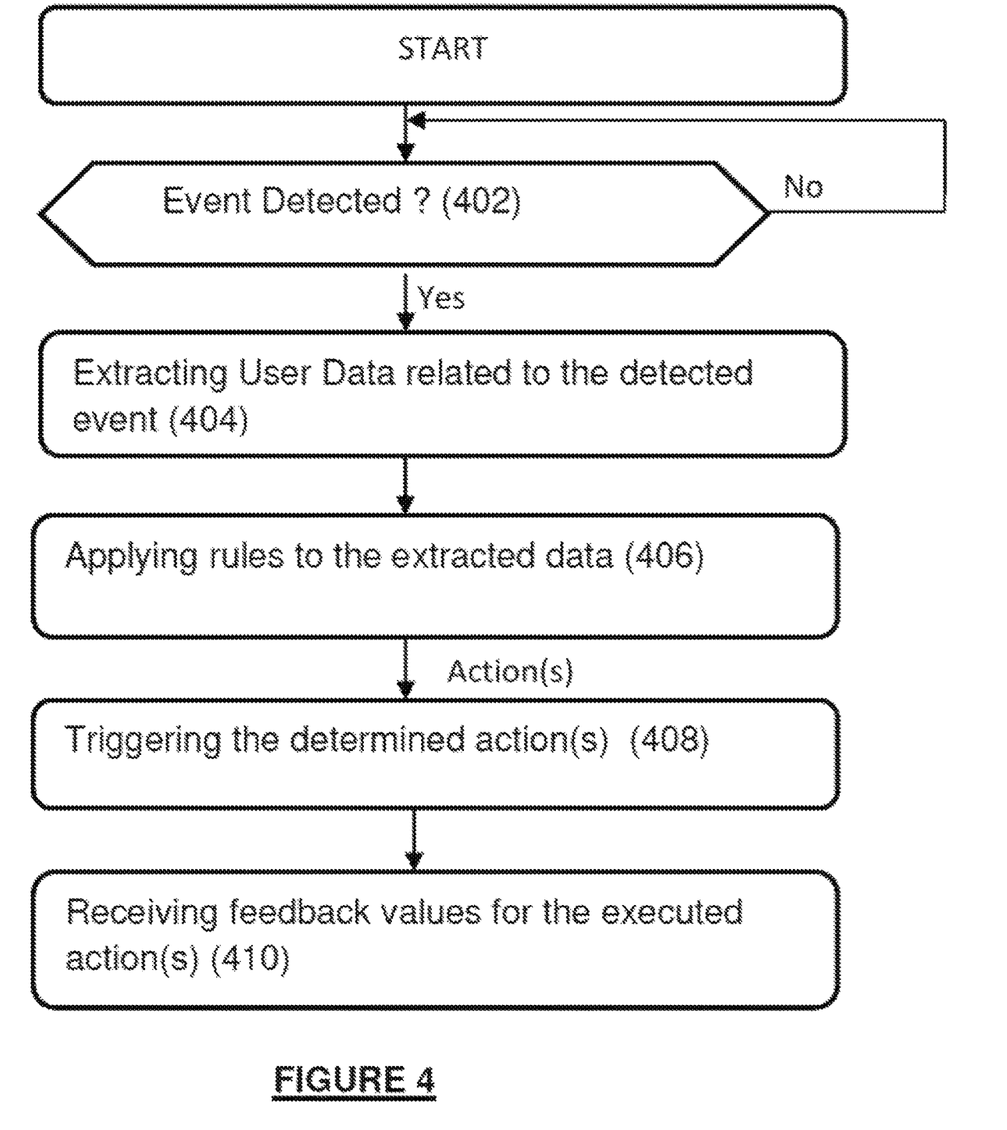
FIG. 4 is a flowchart depicting a method for managing events, according to some embodiments.

FIG. 4 is a flowchart depicting an event detection method according to some embodiments.

At step 402, an event is detected among a list of predefined events from information received from an internal or external device or system, the event being related to one or more users identified in at least one entry of the user database storage 11.

At step 404, user data related to the detected event may be extracted from the user data storage 11. The user data may be related to one or more entry of the user data storage 11. Step 404 may comprise generated a description file integrating the extracted data, such as for example a XSLT file.

At step 406, rules may be applied to the extracted user data. Step 404 may be applied sequentially or in parallel for each entry of the user data storage 11 to which the extracted user data relate.

At step 408, for the extracted user data associated with a given entry of the user data storage 11, one or more actions depending on the extracted data are determined as a result of the application of the rules in step 406.

At step 410, the actions determined in step 408 may be executed.

At step 412, for each executed action, one or more action feedback values may be received from a set of users. The set of users may be the users impacted by the executed action, which may include the users identified in the extracted user data, and/or other users identified in the user data storage 11. The action feedback values may be received in the form of an elementary action score selected among a predefined set of values or in a value range for example, The feedback values received for each executed action may be stored in an action feedback memory in association with the executed action, such as a table.

Figure 5:
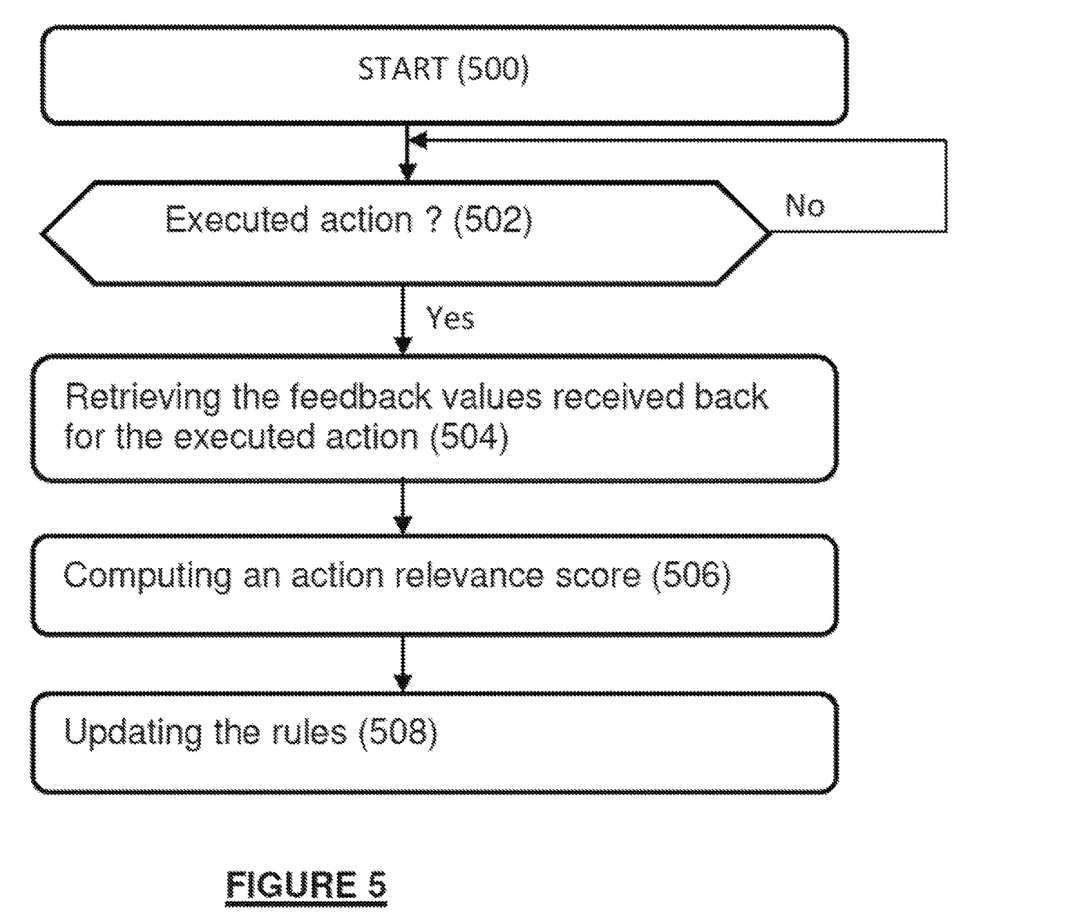
FIG. 5 is a flowchart depicting a method for managing rules using feedback data, according to an embodiment.

FIG. 5 is a flowchart depicting a method of dynamically updating the rules maintained by the rule engine, according to some embodiments.

The method of FIG. 5 may be triggered if, for each executed action, the number of received feedback values is higher or equal to a threshold value, or or alternatively after a predefined period of time (block 500).

At step 504, for the executed action (block 502), the elementary scores received back from users for the executed action may be retrieved from the feedback value memory.

At step 506, an overall action relevance score for the executed action may be computed based on the retrieved elementary scores, In one embodiment, the computation of the action relevance score may include determining a statistical value such as a mean value from the elementary action score. In some embodiment, the step of computing an action relevance score for an executed action may include previously weighting the elementary action scoring received from one or more users depending on a set of weighting criteria. The weighting criteria may include for example an information related to the emitter user (i.e. the user who returned the elementary action scoring to the data delivery system) such as user profile information associated with the user in the user data storage 11, time information (such as a time delay representing the time at which the action has been executed and the time at which the elementary action scoring has been transmitted by the user to the data delivery system), etc.

At step 508, the rules associated with the executed action in the rule memory 401 may be dynamically updated (i.e. creation of new rule(s), deletion of existing rule(s) and/or modification of existing rule(s)) by the rule engine 4 using the computed action relevance score.

Although not limited to such applications, the event management device and method according to the embodiments of the invention have particular advantages for user data collected from various heterogeneous sources of information. In some embodiments, the event management device 1 may be connected to external real time data sources, such as social network systems, to collect various types of information such as weather conditions, information related to particular events (sport events, concerts, world cups, etc.), perturbations (public strikes, manifestations, etc).

The event management device 1 advantageously enables detecting in real time events, identifying user data that are impacted by the event and dynamically determine actions to be executed by internal and/or external applications from the identified user data.

Figure 7:
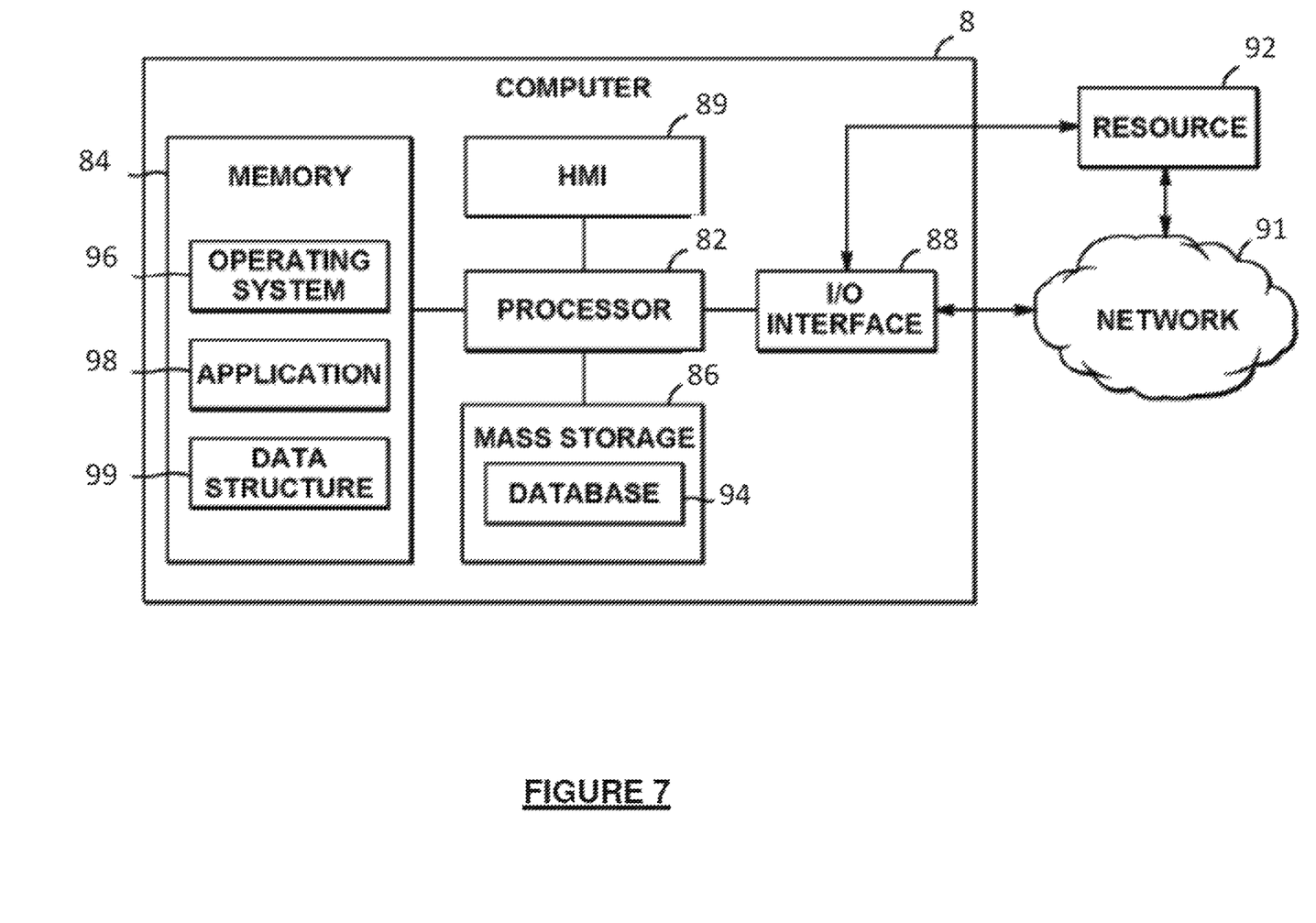
FIG. 7 is a diagrammatic view of an exemplary computing system for hosting a component of the event management device.

Referring now to FIG. 7, the data delivery system 100, and one or more blocks of the event management device 1 may be implemented on one or more computing devices or systems, referred to collectively as a computer, such as computer 8. The computer 8 may include a processor 82, a memory 84, a mass storage memory device 86, an input/output (I/O) interface 88, and a Human Machine Interface (HMI) 89. The computer 8 may also be operatively coupled to one or more external resources 92 via the network 5 and/or I/O interface 88. External resources may include, but are not limited to, servers, databases, mass storage devices, peripheral devices, cloud-based network services, or any other suitable computing resource that may be used by the computer 8.

The processor 82 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 84. Memory 84 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 86 may include data storage devices such as a hard drive, optical drive, tape drive, non-volatile solid state device, or any other device capable of storing information. A database 94 may reside on the mass storage memory device 86 and may be used to collect and organize data used by the various systems and modules described herein.

Processor 82 may operate under the control of an operating system 96 that resides in memory 84. The operating system 96 may manage computing resources so that computer program code embodied as one or more computer software applications, such as an application 98 residing in memory 84, may have instructions executed by the processor 82. In an alternative embodiment, the processor 82 may execute the application 98 directly, in which case the operating system 96 may be omitted. One or more data structures 99 may also reside in memory 84, and may be used by the processor 82, operating system 96, and/or application 98 to store or manipulate data.

The I/O interface 88 may provide a machine interface that operatively couples the processor 82 to other devices and systems, such as the network 91 and/or external resource 92. The application 98 may thereby work cooperatively with the network 91 and/or external resource 92 by communicating via the I/O interface 88 to provide the various features, functions, applications, processes, and/or modules comprising embodiments of the invention. The application 98 may also have program code that is executed by one or more external resources 92, or otherwise rely on functions and/or signals provided by other system or network components external to the computer 8. Indeed, given the nearly endless hardware and software configurations possible, persons having ordinary skill in the art will understand that embodiments of the invention may include applications that are located externally to the computer 8, distributed among multiple computers or other external resources 92, or provided by computing resources (hardware and software) that are provided as a service over the network 91, such as a cloud computing service.

The HMI 89 may be operatively coupled to the processor 82 of computer 8 in a known manner to allow a user of the computer 8 to interact directly with the computer 8. The HMI 89 may include video and/or alphanumeric displays, a touch screen, a speaker, and any other suitable audio and visual indicators capable of providing information to the user. The HMI 89 may also include input devices and controls such as an alphanumeric keyboard, a pointing device, keypads, pushbuttons, control knobs, microphones, etc., capable of accepting commands or input from the user and transmitting the entered input to the processor 82.

The database 94 may reside on the mass storage memory device 86, and may be used to collect and organize data used by the various systems and modules described herein. The database 94 may include data and supporting data structures that store and organize the data. In particular, the database 94 may be arranged with any database organization or structure including, but not limited to, a relational database, a hierarchical database, a network database, an object-oriented database, or combinations thereof. A database management system in the form of a computer software application executing as instructions on the processor 82 may be used to access the information or data stored in records of the database 94 in response to a query, where a query may be dynamically determined and executed by the operating system 96, other applications 98, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

While the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. While the embodiments of FIGS. 4 and 5 have been described according to a particular processing order, the skilled person will readily understand that the invention is not limited to such sequence of steps and that some steps can be implemented in a different order. More generally, in certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

Further, the invention is not limited to a data delivery system 10 delivering travel products, and may apply to various types of data delivery systems. For example, the event detection system may be implemented in a sales optimization tool to detect events corresponding to changes in sales trend, trigger actions in response to the detected events to optimize the sales, using action rules, and dynamically update the rules in response to user feedbacks received for the executed actions.

In another exemplary application of the invention, the event detection system may be implemented in a Global Positioning System used in a vehicle to detect traffic perturbation events, such as manifestation or bad weather conditions, trigger actions in response to the detected events using action rules, and update the rules in response to feedback values received for the executed actions.

The invention claimed is:

1. An event management device for managing events, the event management device comprising:
   an event detector configured to:
   (i) detect the occurrence of an event related to data delivered by a data delivery system, and
   (ii) extract user data related to the detected event from a user data storage, the extracted user data comprising user data stored in at least one entry of the user data storage; and
   a rule manager configured to:
   (i) select one or more rules based on at least one of the detected event or the extracted user data, and
   (ii) determine one or more actions to be executed by applying the selected one or more rules using said extracted user data, wherein the one or more actions to be executed are determined in the form of a logical combination of actions using at least one Boolean operator;
   wherein the event detector is further configured to trigger execution of the one or more determined action based on respective action relevance scores associated with the actions of the logical combination in an action relevance database; and
   wherein the rule manager is further configured, in response to execution of the one or more actions, to:

receive, from each of a plurality of users, a respective feedback value corresponding to the one or more actions, determine whether the number of feedback values received exceeds a threshold, when the number of feedback values exceeds the threshold, execute a machine learning engine to determine an updated action relevance score for each executed action, dynamically update the selected one or more rules based on the action relevance score, and store, in the action relevance database, the updated action relevance scores for each executed action.

2. The event management device of claim 1, wherein the rule manager comprises a rule memory for storing rules and a rule engine for managing said rules stored in the rule memory.

3. The event management device of claim 2, wherein each rule comprises a condition part comprising a logical combination of at least one condition and an action part comprising a logical combination of at least one action, the rule engine being configured to determine said at least one action to be executed from the action part of each applied rule depending on the verification of the logical combination of condition of the applied rule.

4. The event management device of claim 2, wherein the rules are stored in the rule memory in the form of one or more tree data structure associated with the rules, the rule engine being configured to apply a rule to said extracted data by parsing at least one tree data structure.

5. The event management device of claim 4, wherein each tree data structure is associated with a given rule of the rule memory and represents the condition part of the rule.

6. The event management device of claim 1, wherein the device further comprises a data extraction unit configured to extract the user data from the user data storage in response to the detected event, the data extraction unit being further configured to extract event-related data from the detected event.

7. The event management device of claim 6, wherein the data extraction unit is configured to generate a description file integrating the extracted user data and/or the extracted event related data, the description file being used by the rule manager to determine said at least one action to be executed.

8. The event management device of claim 6, wherein the rule manager is configured to select said one or more rules to be applied using extracted user data, and/or extracted event related data from the detected event and/or data from external data sources.

9. The event management device of claim 1, wherein the user data storage comprise one or more entries, the user data stored in each entry of the user data storage comprising user information related to a set of users and/or data information related to the data delivered by said data delivery system to the set of users.

10. A method for managing events in a data delivery system, wherein the method comprises:

detecting the occurrence of an event related to the data delivered by the data delivery system, extracting user data related to the event from a user data storage, the extracted user data comprising user data stored in at least one entry of the user data storage;

selecting one or more rules based on at least one of the detected event or the extracted user data;

determining one or more actions to be executed by applying the selected one or more rules using the extracted user data, wherein the one or more actions to be executed are determined in the form of a logical combination of actions using at least one Boolean operator;

triggering execution of said at least one determined action based on respective action relevance scores associated with the actions of the logical combination in an action relevance database;

in response to execution of the one or more actions:

receiving, from each of a plurality of users, a respective feedback value corresponding to the one or more actions;

determining whether the number of feedback values received exceeds a threhsold; and when the number of feedback values exceeds the threshold, executing a machine learning engine to determine an updated action relevance score for each executed action, dynamically updating the selected one or more rules based on the action relevance score, and storing, in the action relevance database, the updated action relevance scores for each executed action.

11. A non-transitory computer-readable storage medium comprising computer-readable instructions, which when executed by a processor of a computer, cause the computer to:

detect the occurrence of an event related to the data delivered by the data delivery system;

extract user data related to the event from a user data storage, the extracted user data comprising user data stored in at least one entry of the user data storage;

select one or more rules based on at least one of the detected event or the extracted user data;

determine one or more actions to be executed by applying the selected one or more rules using the extracted user data, wherein the one or more actions to be executed are determined in the form of a logical combination of actions using at least one Boolean operator;

trigger execution of said at least one determined action based on respective action relevance scores associated with the actions of the logical combination in an action relevance database;

in response to execution of the one or more actions:

receive, from each of a plurality of users, a respective feedback value corresponding to the one or more actions;

determine whether the number of feedback values received exceeds a threshold;

when the number of feedback values exceeds the threshold, execute a machine learning engine to determine an updated action relevance score for each executed action, dynamically update the selected one or more rules based on the action relevance score, and store, in the action relevance database, the updated action relevance scores for each executed action.

* * * * *